(12) United States Patent
Yamane

(10) Patent No.: US 6,285,833 B1
(45) Date of Patent: Sep. 4, 2001

(54) CAMERA

(75) Inventor: Kenji Yamane, Kawagoe (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/439,499

(22) Filed: Nov. 12, 1999

(30) Foreign Application Priority Data

Nov. 13, 1998 (JP) .................................................. 10-323572

(51) Int. Cl.[7] .................................................... G03B 15/05
(52) U.S. Cl. ............................................ 396/177; 396/206
(58) Field of Search .................................. 396/177, 176, 396/178, 205, 206, 301

(56) References Cited

U.S. PATENT DOCUMENTS 5,749,003 * 5/1998 Tanabe ................................. 396/177
5,822,638 * 10/1998 Yoshida et al. ................. 396/177 X
6,104,882 * 8/2000 Inazuka ................................. 396/177

* cited by examiner

Primary Examiner—W. B. Perkey
(74) Attorney, Agent, or Firm—Arnold International; Bruce Y. Arnold

(57) ABSTRACT

In a camera that has a pop-up strobe flash unit and that requires electrical power to operate functions additional to the pop-up strobe flash unit, there is provided a single mechanism that is operable by the user to control both a pop-up state of the pop-up strobe flash unit and the main electrical power to the camera. With the recent trend in miniaturization of cameras, the single mechanism is helpful in reducing the problem of there being scarce surface area on the camera for locating necessary controls in appropriate positions. By making the single mechanism that is operable by the user be the top surface of the pop-up strobe flash unit itself, surface space useful for grasping the camera is conserved.

6 Claims, 11 Drawing Sheets

ID

CAMERA

BACKGROUND OF THE INVENTION

A camera often requires various switches for its operation. Where the camera includes a pop-up strobe flash unit, these switches usually include a main power switch, a pop-up strobe flash unit release switch, a pop-up detection switch that disables the strobe flash when the strobe flash unit is in a stored state, a mode switch that allows the user to select among various camera modes and so on. Typically, the mode switch allows the user to select from among a fully automatic mode, a shutter speed priority mode, a stop priority mode, a portrait mode, a landscape mode, a close-up mode, a sports mode, etc. Among these switches, switches such as the main power switch, the pop-up strobe flash unit release switch, and the mode switch are usually positioned on the camera body surface so that they can be readily operated by the user. On the other hand, the pop-up detection switch need not be operated by the user and is usually positioned within the body of the camera. The various switches that are positioned on the camera body surface need to be arranged considering ease of operability (defined herein as requiring the switch be arranged in a position so that it is easy to use, is not likely to be pressed unintentionally, does not adversely affect one's ability to hold the camera comfortably), as well as considering the external design and appearance of the camera.

Because cameras being sold are becoming more miniaturized due to progress in electronic technology, it is becoming increasingly difficult to arrange the various switches that are normally found on the camera body surface so that all these conditions are satisfied.

BRIEF SUMMARY OF THE INVENTION

An object of the present invention is to provide a camera that enables the user to control two or more camera functions using a single mechanism that, heretofore, have been controlled by the user operating separate switches. More specifically, an object of the invention is to provide a mechanism that controls both the pop-up state of a strobe flash unit and the main power. Either a latching mechanism or a locking mechanism is provided within the camera body in order to hold the pop-up strobe flash unit (which is biased by a spring to pop-up when released) within the camera body when in the stored state. As in the prior art, a pop-up detection switch is provided within the camera body to detect whether the pop-up strobe flash unit is in the stored state or the popped-up state. By designing the camera such that, instead of merely controlling power to the strobe flash unit as in the prior art, the state of deployment of the strobe flash unit also controls the camera main power switch. Thus, when the strobe flash unit is in the stored state, power to the camera is automatically turned off. Likewise, when the strobe flash unit is in the popped-up state, power to the camera is automatically turned on. Therefore the mechanism that controls the pop-up state of the strobe flash unit also controls whether the main power is turned on or off.

In a first embodiment of the invention, pressing a top surface of the pop-up strobe flash unit towards the camera body surface until it latches causes the strobe flash unit to be stored within the camera body. Pressing the top surface of the pop-up strobe flash unit again then releases a latching mechanism so that the pop-up unit pops up from the camera surface. The popping-up of the strobe flash unit automatically turns on the main power. Likewise, placing the strobe flash unit in the stored state automatically turns off the main power.

In a second embodiment of the invention, a lock release button is provided on the top surface of the pop-up strobe flash unit. Rather than the strobe flash unit being pressed a second time to cause the strobe flash unit to pop-up and the camera power to be energized, in this embodiment the strobe flash unit is locked in position such that a second pressing on the top surface of the pop-up strobe flash unit has no effect. Instead, in order to release the strobe flash unit to its popped-up state, it is necessary to press a lock release button.

BRIEF DESCRIPTION OF THE DRAWINGS

The present invention will become more fully understood from the detailed description given below and the accompanying drawings, which are given by way of illustration only and thus are not limitative of the invention, wherein.

DETAILED DESCRIPTION

This invention relates to a camera and, in particular, to a camera wherein the operation and external design are improved by reducing the number of switches on the camera body surface.

Because this invention employs a single mechanism that functions both to control the deployment state of a pop-up strobe flash unit and the main power to the camera, both of which heretofore have been controlled by separate switches on the surface of the camera, the number of switches on the camera body surface can be reduced. This is accomplished by detecting the state of deployment of the pop-up strobe flash unit and automatically turning on/off the main power when the strobe flash unit is deployed/stored by using a combined switch within the camera body which not only signals the state of deployment of the strobe flash unit but also turns on/off the power. When in the popped-up state, pressing the top surface of the pop-up strobe flash unit causes the strobe flash unit to energize a spring as the pop-up strobe flash unit is lowered by being rotated about a pin which attaches the pop-up strobe flash unit to the camera body. When the strobe flash unit becomes engaged by a latching mechanism or a locking mechanism, the pop-up flash unit is then held in a stored state until being released by the camera operator.

An explanation of two different embodiments of the invention will now be provided, with reference to the drawings.

Figure 1:
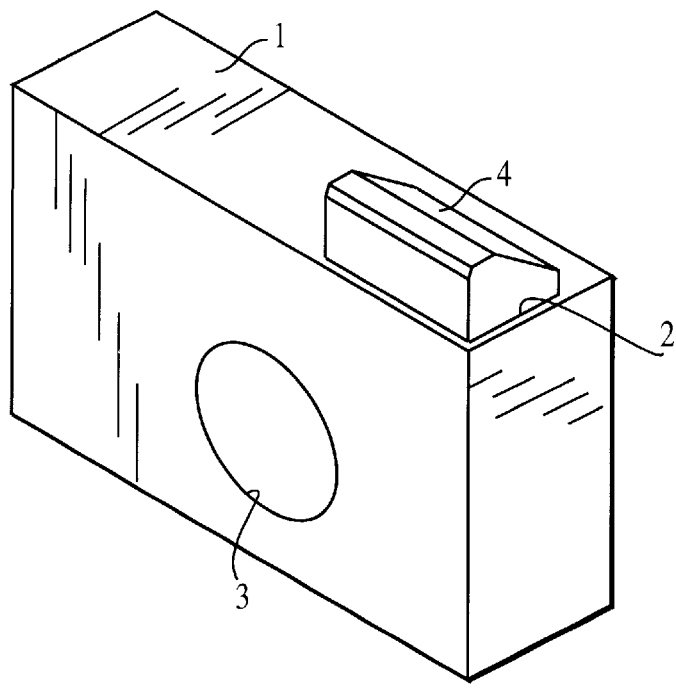
FIG. 1 is a perspective view of a camera according to a first embodiment of the invention, illustrating a configuration of the camera with a pop-up strobe flash unit in the popped-up state and the camera power on, FIG. 2 shows the camera of FIG. 1 with the pop-up strobe flash unit in its stored state and the camera power off.
Figure 2:
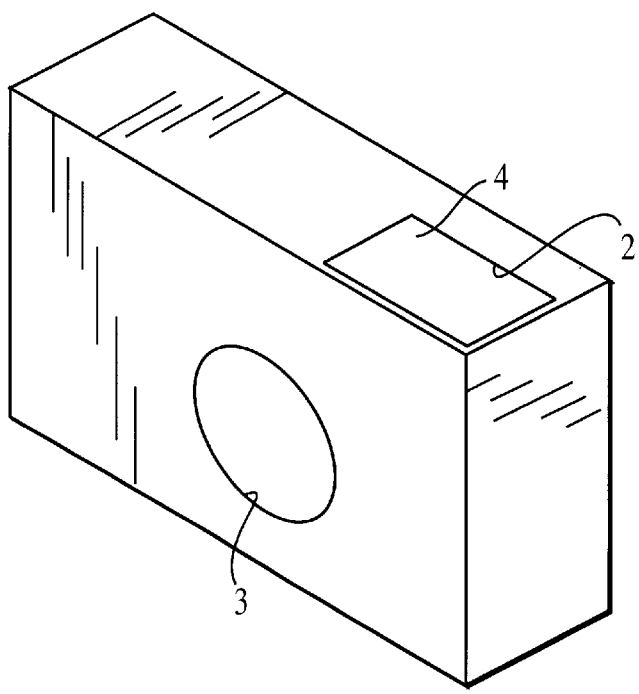
Figure 3:
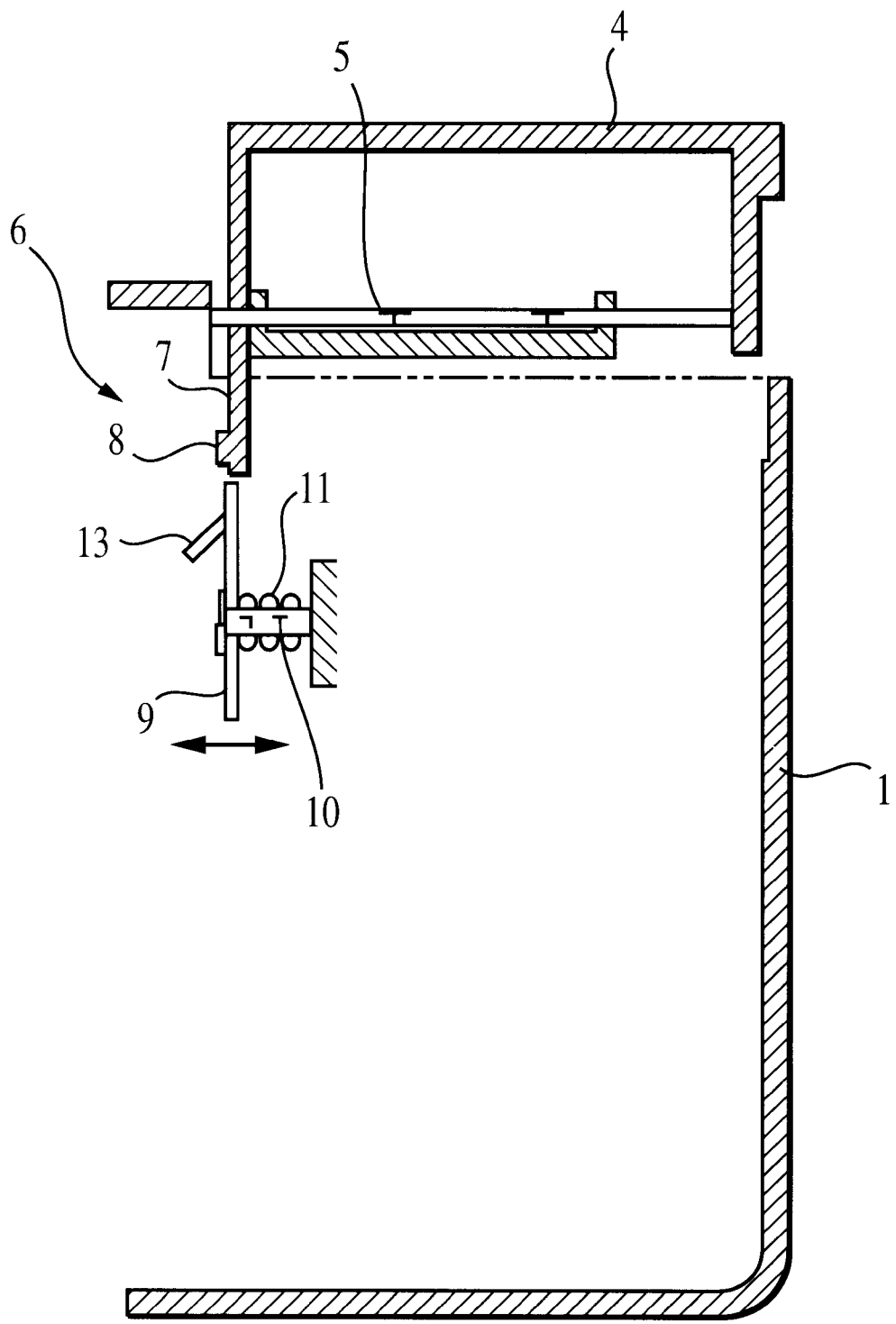
FIG. 3 is a cross-sectional view of the first embodiment when in the condition illustrated in FIG. 1, (i.e., with the pop-up strobe flash unit in the popped-up state and the camera power on)
Figure 4:
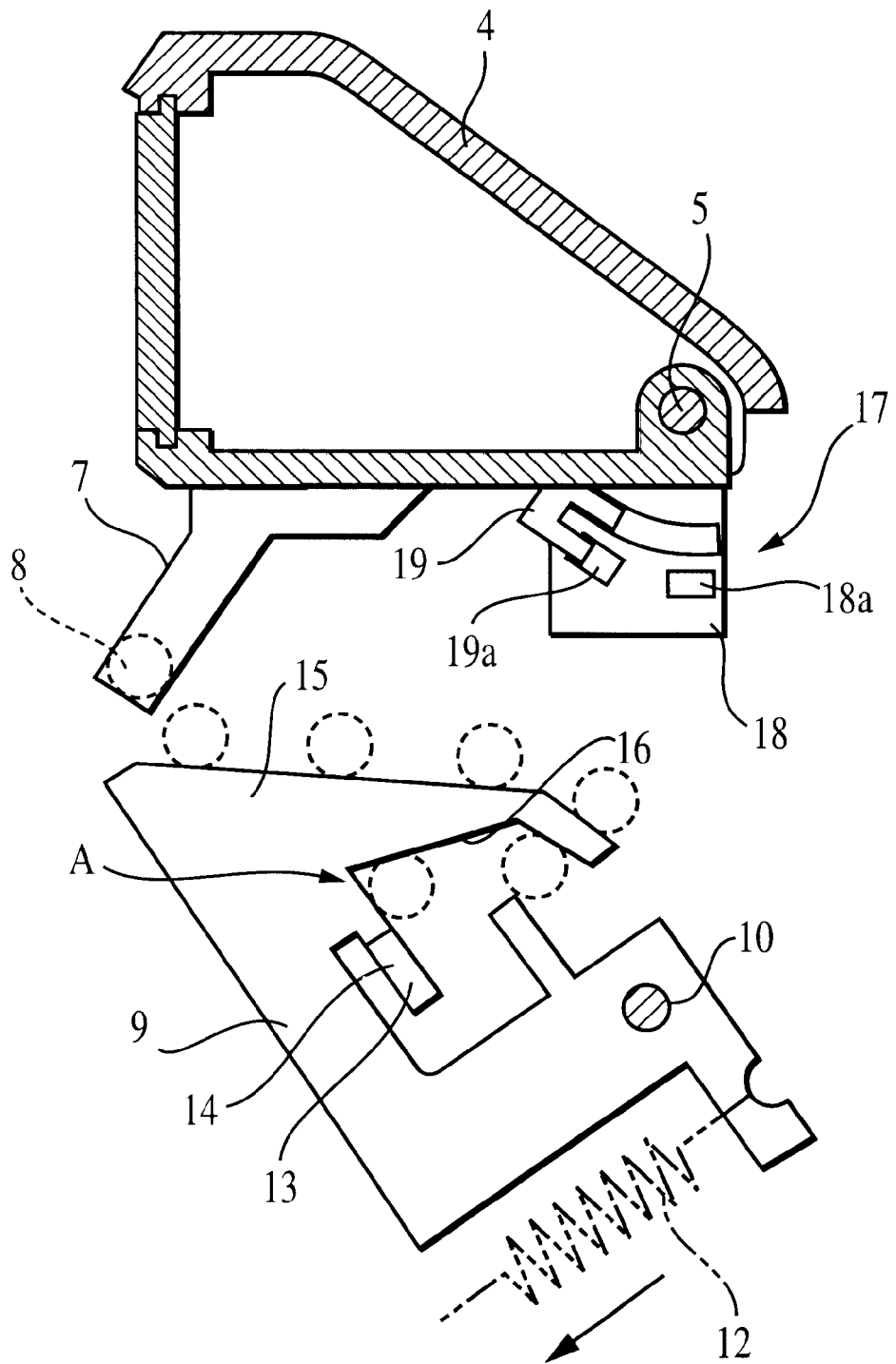
FIG. 4 shows the relationship between the pop-up strobe flash unit and a latching mechanism as in the first embodiment of the invention when the pop-up strobe flash unit has been released by the latching mechanism and has popped-up.

FIGS. 1–6 illustrate the first embodiment of the camera of this invention. As shown in FIG. 1, camera body 1 is formed in a box shape, on the top surface of which is positioned a rectangular or square opening 2. Within this, a pop-up strobe flash unit 4 is attached to the camera body 1 so that the pop-up strobe flash unit may be popped-up by being rotated on a supporting pin 5 (FIG. 4). On the front surface of the camera body I a circular opening 3 is provided for attaching a lens (not shown).

The pop-up strobe flash unit 4 has a shape that allows it to rotate within the opening 2 of the camera body 1. The pop-up strobe flash unit 4 is attached to the camera body 1 by the support pin 5. The entire pop-up strobe flash unit 4 is stored inside the camera body 1 against the force of an energized pop-up spring (not shown) when the pop-up strobe unit 4 is rotated downward about the support pin 5, and pops out of the camera body 1 by force of the energized pop-up spring when the pop-up strobe unit 4 is leased from its stored position. A latching mechanism 6 (FIG. 3) is positioned inside the camera body 1 under the pop-up strobe flash unit 4. When the pop-up strobe flash unit 4 is stored inside the camera body 1, it is held in that state by the latching mechanism 6.

The latching mechanism 6 includes a hook pawl 7 that is positioned on the bottom of the pop-up strobe flash unit 4, a hook lever 9 that is positioned so as to be freely rotatable below the hook pawl 7, and a support pin 10 that supports the hook lever 9 so as to be freely rotatable. The support pin 10 is attached to the camera body 1. The latching mechanism also includes a rotational-direction-maintaining spring 12 (FIG. 4) that maintains the hook lever 9 on the support pin 10 in a specified position between the camera body 1 and the hook lever 9, and an axial direction-maintaining spring 11 (FIG. 3) that maintains the hook lever 9 on the support pin 10 at a specified position in the axial direction. The axial-direction-maintaining spring 11 is positioned on the support pin 10, and an axial-direction cam section 13 is positioned on the hook lever 9 and moves the hook lever 9 in the axial direction on the support pin 10 against energized, axial direction-maintaining spring 11. The hook pawl 7 has a plate shape, on the tip of which a hook section 8 is positioned as one unit, and the pop-up strobe flash unit 4 is locked in the stored state by this hook section 8 being hooked by the hook lever 9.

The hook lever 9 also has a plate shape. Facing the hook pawl 7 there is positioned a rotational cam section 15, with which the hook section 8 of the hook pawl 7 is in contact. A hook groove 16 is positioned on rotational cam section 15 so that the hook section 8 of the hook pawl 7 may be hooked inside this hook groove 16 (as shown by position "A" in FIG. 4).

Figure 5:
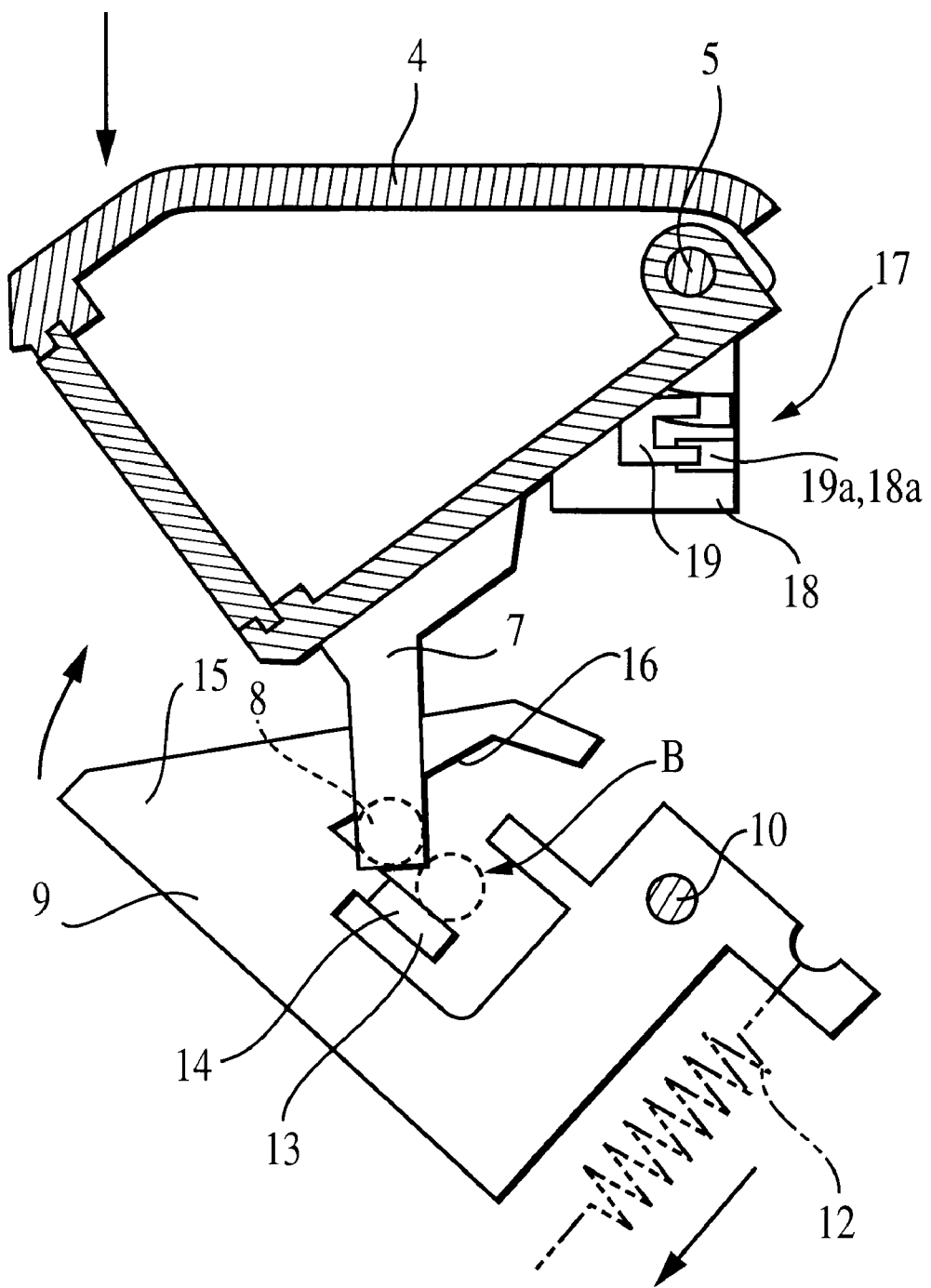
FIG. 5 shows the relationship between the pop-up strobe flash unit and the latching mechanism when the pop-up strobe flash unit is in the stored state, which is achieved by pressing the top surface of the pop-up strobe flash unit in the direction indicated by the arrow until the latching mechanism is engaged.
Figure 6:
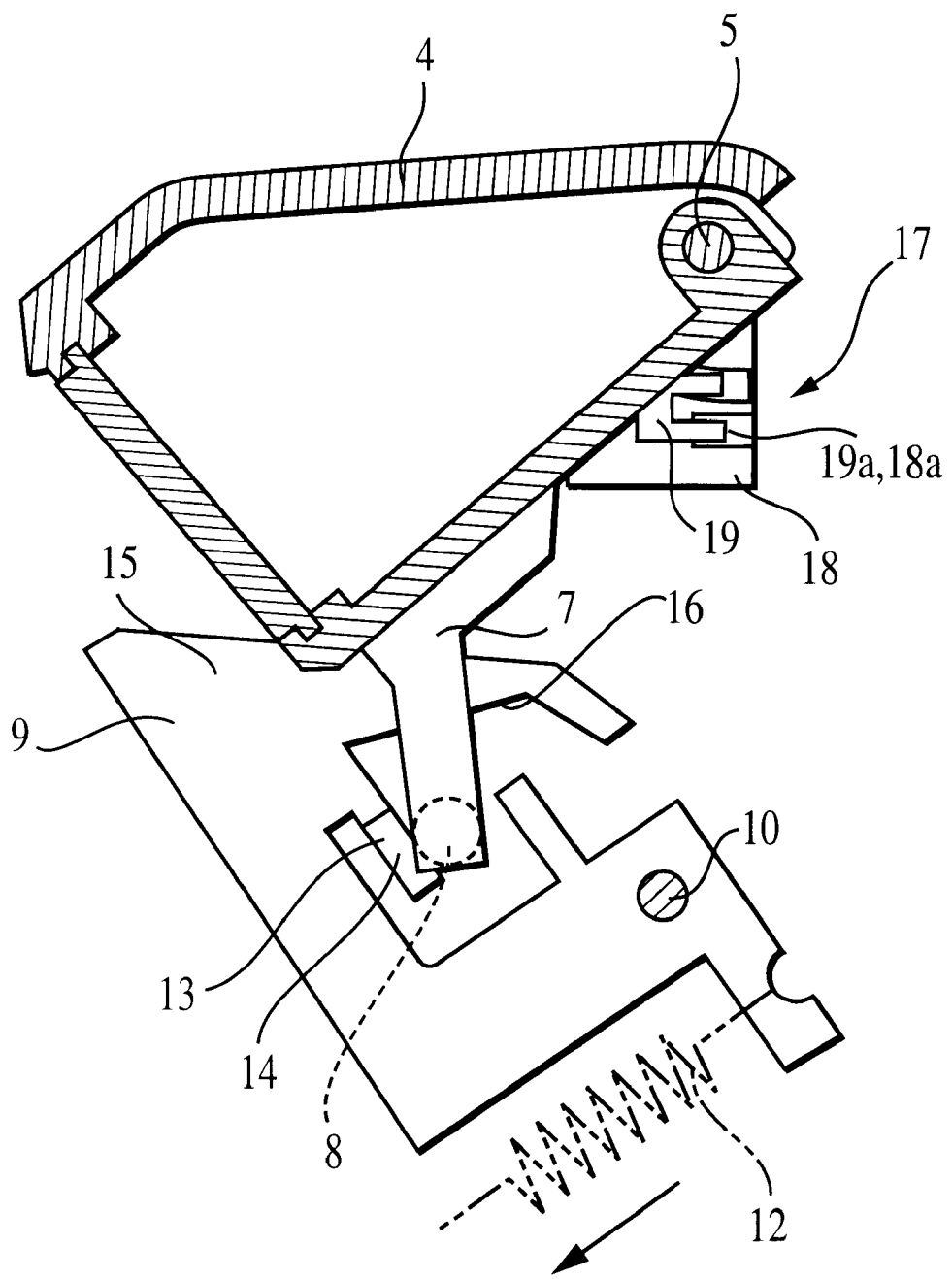
FIG. 6 shows the relationship between the pop-up strobe flash unit and the latching mechanism as the pop-up strobe flash unit is about to be released from its stored state by its top surface being pressed a second time in order to disengage the latching mechanism and thereby allow the pop-up strobe flash unit to pop up.
Figure 7:
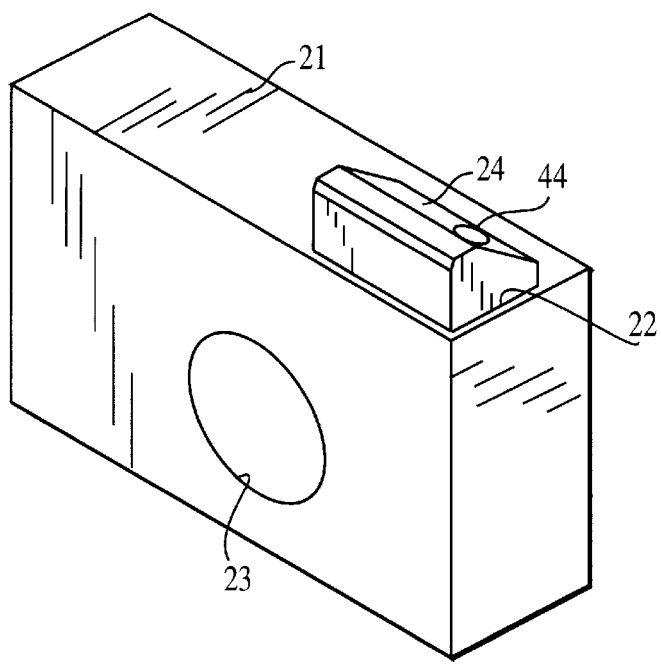
FIG. 7 is a perspective view showing a second embodiment of the camera of the invention when the power is on, FIG. 8 shows the camera of the second embodiment when the power is off.
Figure 8:
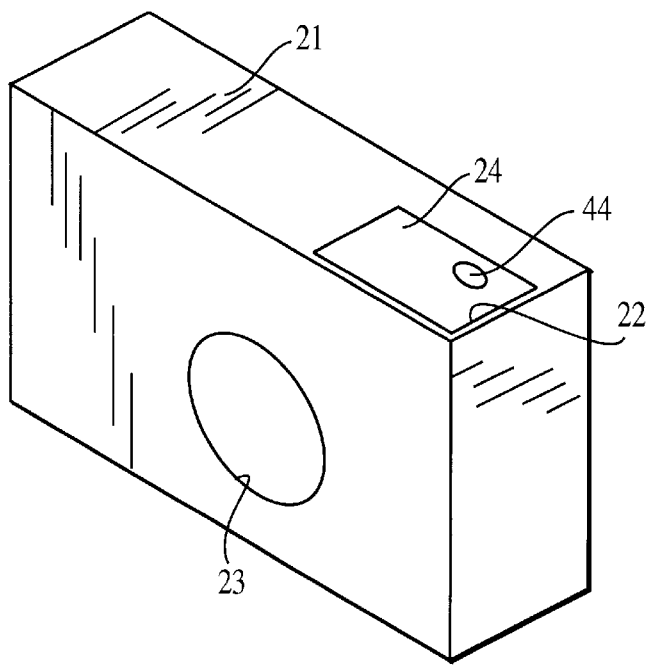

In a deeper section of the hook lever 9 than the location of hook groove 16, an axial direction cam section 13 is formed as a single unit. The axial-direction cam section 13 has a slope 14 that slopes at a specified angle in the axial direction of the support pin 10. When the hook section 8 rotates to the position "B", as illustrated in FIG. 5, the hook lever 9 rotates due to the force of the energized, rotational-direction-maintaining spring 12, and the hook section 8 moves onto the slope 14. By the hook section 8 of the hook pawl 7 moving onto this slope 14, the hook lever 9 moves in the axial direction on the support pin 10 against energized, axial-direction-maintaining spring 11. This results in the hook section 8 of the hook pawl 7 coming out of the hook groove 16.

Positioned inside the camera body 1 is a pop-up detection switch 17 to detect the pop-up state (stored versus popped-out) of the pop-up strobe flash unit 4. The pop-up detection switch 17 consists of a fixed plate 18 attached to the camera body 1 and a movable plate 19 attached to the pop-up strobe flash unit 4 so that a contact 19a of the movable plate 19 and a contact 18a of the fixed plate 18 make electrical contact with each other when the movable plate 19 rotates as a single unit with the pop-up strobe flash unit 4. The pop-up detection switch 17 is combined with the main power switch of the camera, constructed so that the main power switch turns off when the pop-up detection switch 17 has detected the stored state of the pop-up strobe flash unit 4 and turns on when it has detected the popped-out state.

The operation of the first embodiment of the invention will now be explained. First of all, if the pop-up strobe flash unit 4 is pushed down, the pop-up strobe flash unit 4 rotates, thereby centering the supporting pin 5 against the energized pop-up spring (not shown). The hook section 8 of the hook pawl 7 contacts with the rotational cam section 15 of the hook lever 9, the hook lever 9 is pushed downward via the rotational cam section 15, and the hook lever 9 rotates, thereby centering the support pin 10 against the energized, rotational-direction-maintaining spring 12. At the same time, the hook section 8 of the hook pawl 7 moves along the surface of the rotational cam section 15, goes into the hook groove 16, and is hooked in the deep part of the hook groove 16. Thus, the entire pop-up strobe flash unit 4 is stored inside the camera body 1 and is held in that state. Pop-up detection switch 17 then detects that the pop-up strobe flash unit 4 has been stored inside the camera body 1, and the main power is automatically turned off Next, if the pop-up strobe flash unit 4 is pushed down farther from the stored state, the pop-up strobe flash unit 4 rotates farther, thereby centering the supporting pin 5 against the energized pop-up spring. The hook lever 9 is pushed downward by the hook section 8 of the hook pawl 7, and the hook lever 9 rotates. Thus, the support pin 10 is centered against the energized, rotational-direction-maintaining spring 12. When the hook pawl 7 rotates a specified amotmt, the hook lever 9 rotates, and the hook section 8 of the hook pawl 7 moves from the hook groove 16 to the axial-direction cam section 13. After that, if the downward pressure is reduced, the axial-direction end face of the hook section 8 of the hook pawl 7 makes contact with the slope 14 of the axial-direction cam section 13. When the hook section 8 of the hook pawl 7 moves onto the slope 14 of the axial-direction cam section 13, it causes the hook lever 9 to move in the axial direction on the support pin 10 against energized axial-direction-maintaining spring 11. Thus, the hook section 8 of the hook pawl 7 disengages from the hook groove 16, and the pop-up strobe flash unit 4 rotates, thereby centering itself on the supporting pin 5 by means of the energized pop-up spring. Thus, the entire pop-up strobe flash unit 4 pops up out of the camera body 1, and the latched state is released. The pop-up detection switch 17 then detects that the pop-up strobe flash unit 4 has popped out of the camera body 1 and the main power is automatically energized.

In a camera of this embodiment constructed in the manner indicated above, by combining the main power switch with the pop-up detection switch 17 of the pop-up strobe flash unit 4, the number of switches positioned on the camera body 1 surface can be reduced. Therefore, the invention is compatible with the recent trend toward miniaturization of cameras, since it eases the problem of there being less surface area that is suitable for locating camera controls. Also, because the main power switch is turned on/off by utilizing the action of the pop-up strobe flash unit 4 with a large stroke, there is only a small chance that the main power switch will be mistakenly turned on/off.

FIGS. 7–17 illustrate a second embodiment of the camera of this invention. In this embodiment, just as in the first embodiment, there is no longer a need for a separate main power switch that is positioned on the camera body 21 surface. Instead the main power switch is combined with the pop-up detection switch 47 (FIG. 12) of the pop-up strobe flash unit 24.

Just as in the first embodiment, the camera body 21 is formed in a box-shape, on the top surface of which is positioned a rectangular or square opening 22. Within the opening 22, a pop-up strobe flash unit 24 is attached to the camera body 21 so that the pop-up strobe flash unit may be popped-up by being rotated on a supporting pin. On the front surface of the camera body a circular opening 23 is provided for attaching a lens (not shown).

Figure 9:
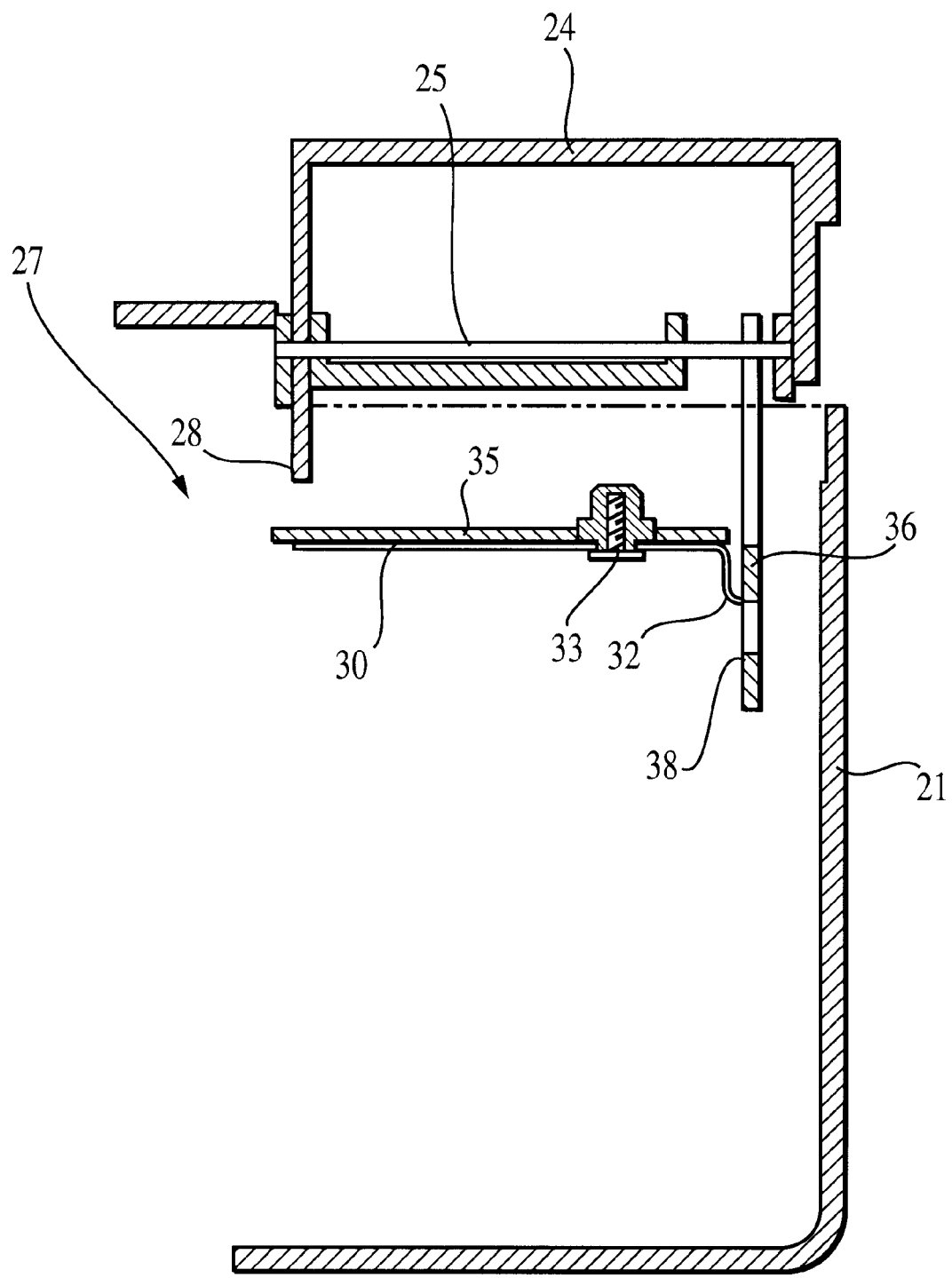
FIG. 9 is a cross-sectional view of the camera of the second embodiment when the power is on, FIG. 10 is a top view of the camera illustrated in FIG. 9.
Figure 10:
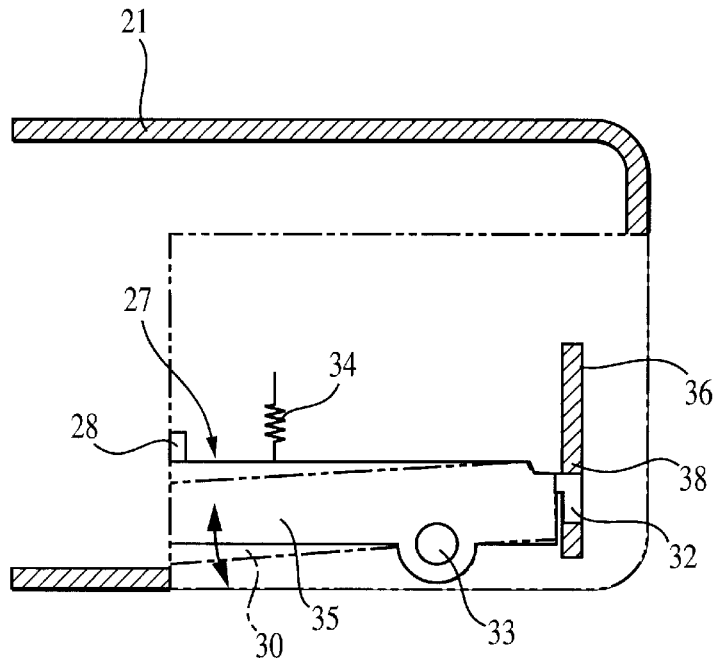
Figure 11:
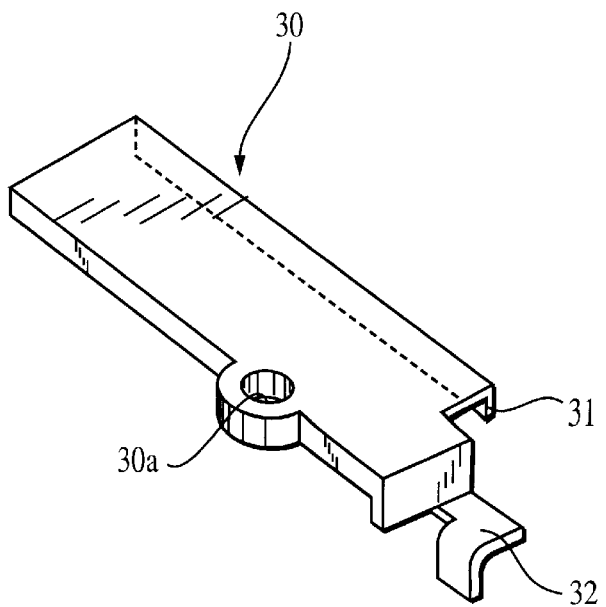
FIG. 11 is a perspective view of a hook lever as in the second embodiment of the invention.
Figure 12:
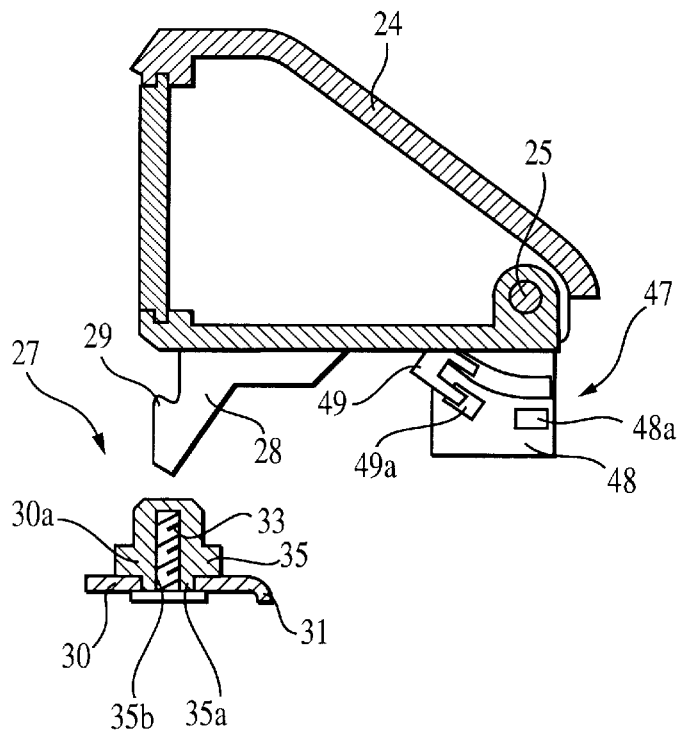
FIG. 12 shows the relationship, when the pop-up strobe flash unit is popped-up, between the pop-up strobe flash unit and a locking mechanism that includes a separate lock release lever.
Figure 13:
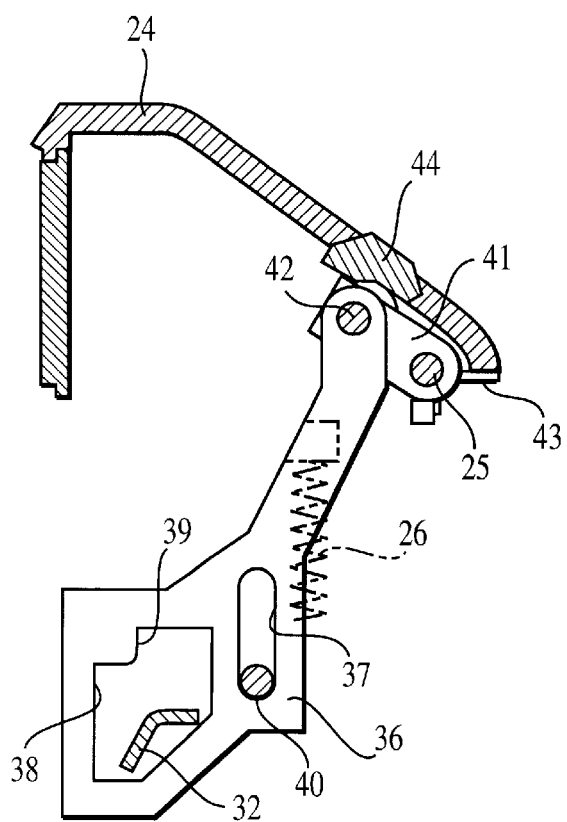
FIG. 13 shows the relationship, when the pop-up strobe flash unit is popped-up, between the pop-up strobe flash unit and the locking mechanism, but illustrates an opposite side from that illustrated in FIG. 12 and depicts details of the lock release lever.
Figure 14:
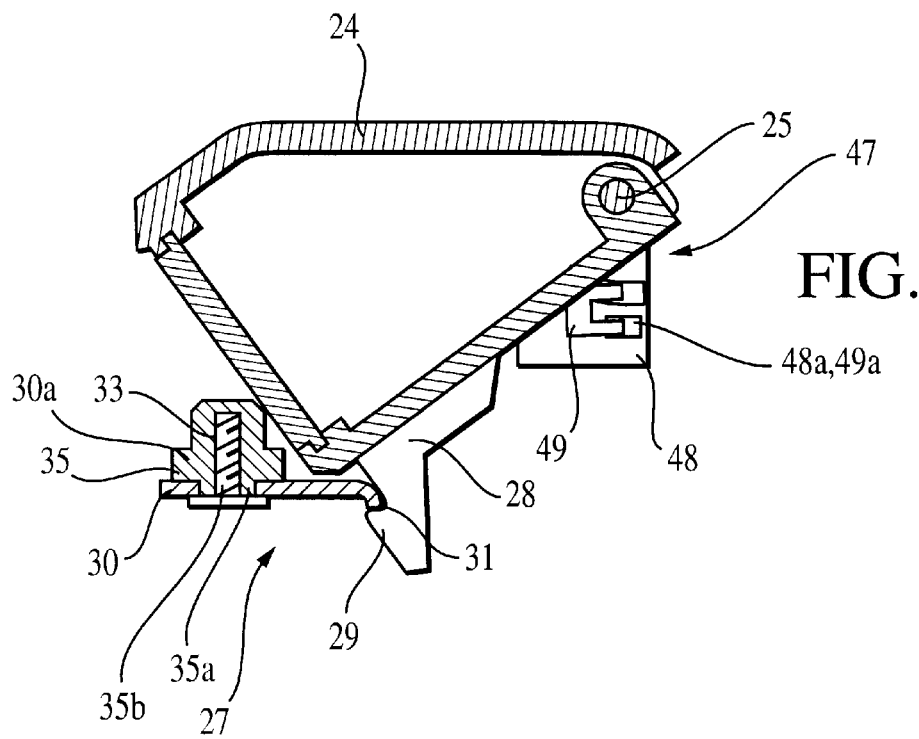
FIG. 14 shows the relationship, when the pop-up strobe flash unit is in its stored state, between the pop-up strobe flash unit and the locking mechanism.
Figure 15:
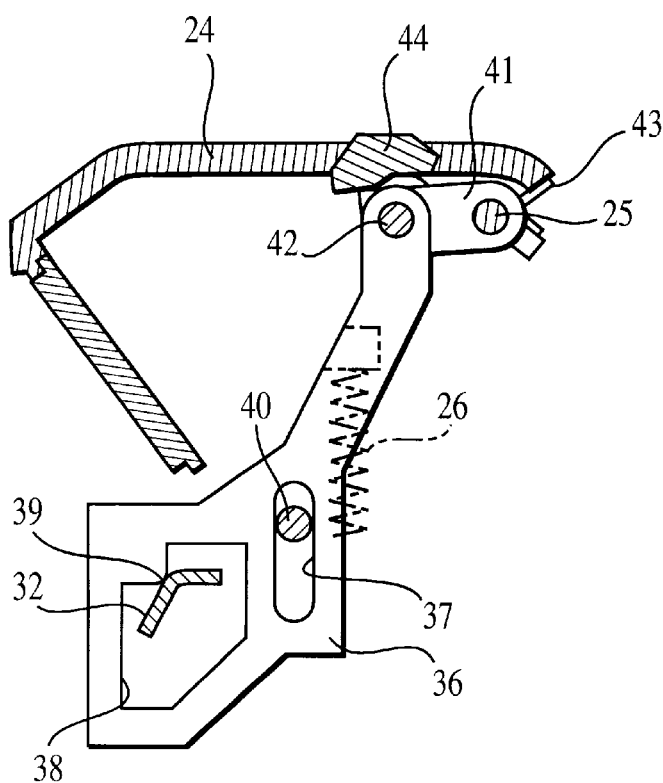
FIG. 15 shows the relationship, when the pop-up strobe flash unit is in the stored state, between the pop-up strobe flash unit and the locking mechanism, but illustrates an opposite side than that illustrated in FIG. 14 and depicts details of the lock release lever.
Figure 16:
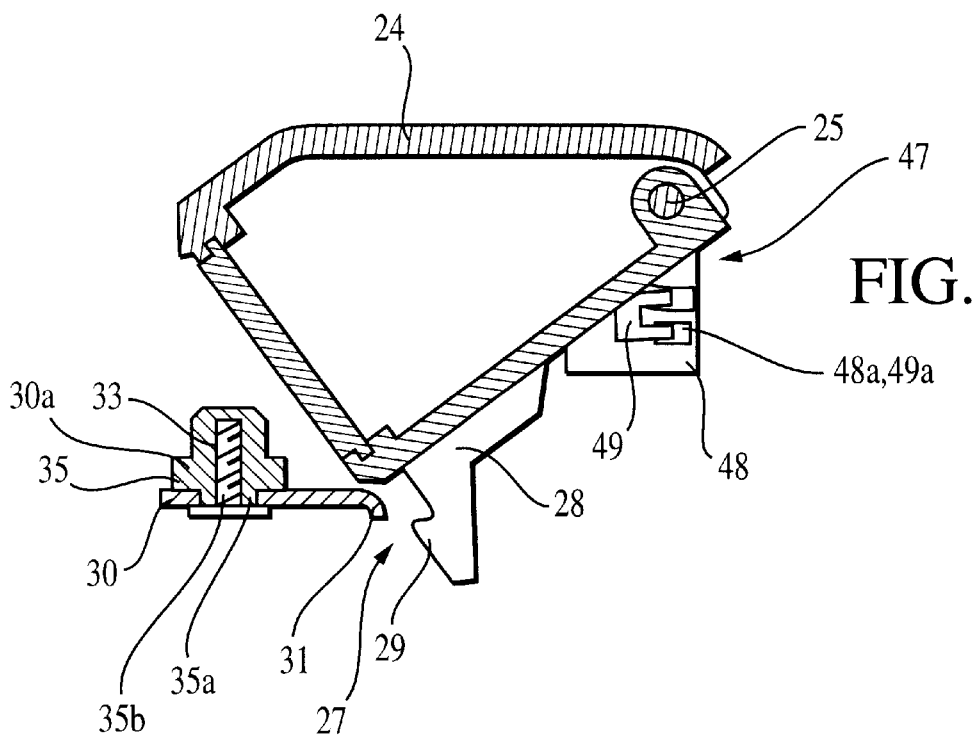
FIG. 16 shows the relationship, when the locked state of the pop-up strobe flash unit has just been released and before it has rotated to the popped-up position, between the pop-up strobe flash unit and the locking mechanism.

In the same way as shown in the first embodiment, the pop-up strobe flash unit 24 has a shape that enables the strobe flash unit 24 to be freely rotatable in the opening 22 of the camera body 21 via a support pin 25 (FIG. 9). The entire pop-up strobe flash unit 24 is stored inside the camera body 21 against the energized, pop-up spring 26 (FIG. 13) and is held in place by a locking mechanism 27 (FIG. 9) when rotated in one direction, and pops out of the camera body 21 by the energized, pop-up spring 26 when the locking mechanism 27 is released. The locking mechanism 27 is positioned under the pop-up strobe flash unit 24 inside the camera body 21.

The locking mechanism 27 is equipped with: a hook pawl 28 that is positioned on the bottom of the pop-up strobe flash unit 24; a hook lever 30 that is positioned to freely oscillate below the hook pawl 28; a direction-maintaining spring 34 (FIG. 10) that maintains the hook lever 30 at a specified position in the oscillation direction; a supporting plate 35 that is attached to the camera body 21; a fixing screw 33 that attaches the hook lever 30 to freely oscillate in the supporting plate 35; and a hook release lever 36 that is positioned between the hook lever 30 and the pop-up strobe flash unit 24.

The hook pawl 28 has a plate shape, on the tip of which an L-shaped, hook section 29 (FIG. 12) is positioned as a single unit, and the pop-up strobe flash unit 24 is locked in the stored state by this hook section 29 being hooked by the hook lever 30.

The hook lever 30 (FIG. 11) has a plate shape, where an L-shaped hooked section 31 is positioned bending downward in one width-direction end as one unit, so that the hook section 29 (FIG. 12) of the hook pawl 28 hooks to this hooked section 31. On the other width-direction end of the hook lever 30 there is a hole 30a, and by inserting a projection 35a that is positioned beneath the support plate 35 into the hole 30a and screwing the fixing screw 33 into a screw hole 35b that is positioned in the center of the projection 35a from the bottom of the hook lever 30, the hook lever 30 can be attached so as to be freely oscillatable in the supporting plate 35.

On one end of the hook lever 30 (FIG. 11) in the length dimension, there is positioned a pressed section 32 that bends downward as a single unit. By pressing this pressed section 32 using a hook release lever 36, the hook lever 30 moves, thereby centering the center of the fixing screw 33 against the energized, direction-maintaining spring 34. This causes the hook section 29 of the hook pawl 28 to come out of the hooked section 31 of the hook lever 30.

The hook release lever 36 (FIG. 13) has a plate shape, supported so as to be vertically movable by a supporting pin 40. On the top of the pop-up strobe flash unit 24 corresponding to the top end of the hook release lever 36 is positioned a lock release button 44, so that the hook release lever 36 is moved downward by pressing this lock release button 44. The top end of the hook release lever 36 is connected to the pop-up strobe flash unit 24 side via a connector plate 41. Pop-up strobe flash unit 24 is attached to one end of the connector plate 41 via a support pin 25 so as to be freely rotatable. The other end of the connector plate 41 is attached so as to be freely rotatable in the top end of the hook release lever 36 via a connector pin 42. Positioned between the pop-up strobe flash unit 24 and the connector plate 41 is a hook release lever maintaining spring 43 that maintains the hook release lever 36 at a specified position in the vertical direction.

On the bottom end of the hook release lever 36, there is positioned a slot 37 extending vertically, and by positioning the supporting pin 40 inside the slot 37, the hook release lever 36 is supported so as to be freely movable in the vertical direction. Positioned on a part of the hook release lever 36 that adjoins the slot 37 is a hook groove 38, so that the pressed section 32 of the hook lever 30 is located in this hook groove 38. Positioned on the top of the hook groove 38 is an angular-shaped, press section 39 projecting downward obliquely as one unit, and by making the press section make contact with the pressed section 32 of the hook lever 30, the hook lever 30 moves, thereby centering the center of the fixing screw 33 against the energized, direction-maintaining spring 34, so that the hook section 29 of the hook pawl 28 disengages from the hooked section 31 of the hook lever 30.

Positioned inside the camera body 21 is a pop-up detection switch 47 (FIG. 12) which detects the pop-up action (stored state and popped-out state) of the pop-up strobe flash unit 24. The pop-up detection switch 47 includes a fixed plate 48 attached to the camera body 21 side and a movable plate 49 attached to the pop-up strobe flash unit 24 side, so that a contact 49a of the movable plate 49 and a contact 48a of the fixed plate 48 make electrical contact with each other when the movable plate 49 rotates as a single unit with the pop-up strobe flash unit 24. Thus, pop-up detection switch 47 is combined with the main power switch of the camera and the operation is such that the main power switch turns off when the pop-up detection switch 47 has detected the stored state of the pop-up strobe flash unit 24. Further, the main power turns on when the pop-up detection switch has detected the popped-out state.

Figure 17:
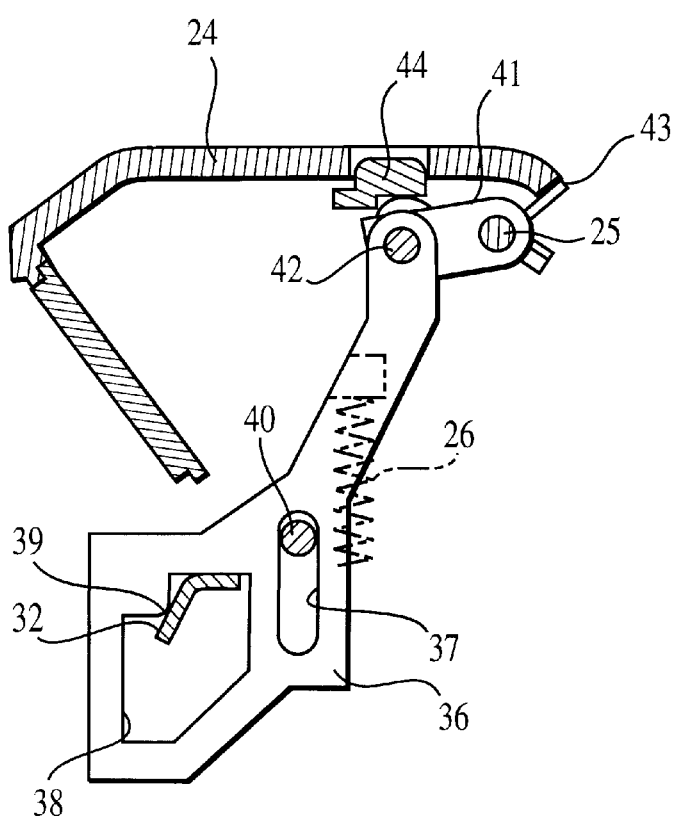
FIG. 17 shows the relationship, when the locked state of the pop-up strobe flash unit has just been released and before it has rotated to the popped-up position, between the pop-up strobe flash unit and the locking mechanism, but from the opposite side than that illustrated in FIG. 16, showing the position of the lock release lever.

Next, the operation of the above-discussed structure will be explained. First of all, if the pop-up strobe flash unit 24 is pushed down, the pop-up strobe flash unit 24 rotates, thereby centering the support pin 25 against energized pop-up spring 26 (FIG. 17). The hook section 29 of the hook pawl 28 makes contact with the hook lever 30, moves on the surface of the hook lever 30, and hooks at the hooked section 31. Thus, the entire pop-up strobe flash unit 24 is stored inside the camera body 21 and is held there.

When the pop-up detection switch 47 detects that the pop-up strobe flash unit 24 has been stored inside the camera body 21, the main power is automatically turned off Then, if the lock release button on the top of the pop-up strobe flash unit 24 is pressed while in this state, the hook release lever 36 moves downward, the press section 39 of the hook groove 38 comes into contact with the top of the pressed section 32 of the hook lever 30, and by the pressed section 32 being pressed, the hook lever 30 moves. This centers the fixing screw 33 against the energized, direction-maintaining spring 34. Then, the hook section 29 of the hook pawl 28 disengages from the hooked section 31 of the hook lever 30, and the pop-up strobe flash unit 24 rotates, thereby centering the support pin 25. Due to the force of the energized pop-up spring 26, the pop-up strobe flash unit 24 pops out of the camera body 21 and the locked state is released. Then, the pop-up detection switch 47 detects that the pop-up strobe flash unit 24 has popped out of the camera body 21, and the main power is automatically turned on.

With the camera of this embodiment constructed in the manner described above, just as with the first embodiment, the number of switches positioned on the camera body 21 surface is reduced. Therefore, the present invention is particularly compatible with the recent trend toward more miniaturized cameras. Also, in this embodiment, because the pop-up strobe flash unit 24 is not released by a second pressing on the top of the strobe flash unit, but instead requires that the release button 44, which may be located on the pop-up strobe flash unit 24, be pressed, unintentional turning-on of the power can be prevented when carrying the camera with the intent that the camera remain off.

Because this invention is constructed in the described manner, the main power switch is effectively combined with the switch that controls the pop-up strobe flash unit. Thus, the number of switches positioned on the camera body surface can be reduced. Therefore, both embodiments of the invention are compatible with the recent trend toward miniaturization of cameras because of there being less surface area that is suitable for locating camera controls. In the first embodiment, because the second pressing on the top of the strobe unit must be one that forces the top of the strobe flash unit below the surface of the camera body, the risk of mistakenly turning the main power on/off is small. In the second embodiment, because the pop-up strobe flash unit is released only by pressing a lock release button that is positioned on the pop-up strobe flash unit, unintentional turning on of the power is even more unlikely than in the first embodiment.

The invention being thus described, it will be obvious that the same may be varied in many ways. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. In a camera that has a pop-up strobe flash unit and that requires electrical power in order to operate functions additional to the pop-up strobe flash unit, the improvement of there being:

a biasing means that biases the pop-up strobe flash unit toward a popped-up state;

a latching means that functions to hold the pop-up strobe flash unit within the camera in a stored position when a top surface of the pop-up flash unit is pressed once so as to position the pop-up strobe flash unit within the camera, and to release the pop-up strobe flash unit to its popped-up state when the top surface of the pop-up strobe flash unit is pressed once more; and an electrical switch that automatically controls main electrical power to the camera depending whether the pop-up strobe flash unit is in its stored position or its popped-up state.

2. The camera of claim 1 wherein, when the pop-up strobe flash unit is stored within the camera, electrical power to the camera is automatically turned off.

3. The camera of claim 1 wherein, when the pop-up strobe flash unit is popped-up, electrical power to the camera is automatically turned on.

4. In a camera that has a pop-up strobe flash unit and that requires electrical power in order to operate functions additional to the pop-up strobe flash unit, the improvement of there being:

a means to bias the pop-up strobe flash unit toward a popped-up state;

an electrical switch that automatically controls main electrical power to the camera depending on the position of the pop-up strobe flash unit;

a release button that is operable by the user to release the pop-up strobe flash unit to its popped-up state, said popped-up state automatically causing the electrical switch to supply main electrical power to the camera; and a locking means that functions to hold the pop-up strobe flash unit within the camera in its stored position when a top surface of the pop-up strobe flash unit is pressed so as to position the pop-up strobe flash unit within the camera;

wherein the main electrical power to the camera is automatically shut off by the electrical switch when the pop-up strobe flash unit is in its stored position within the camera.

5. A camera comprising:

a pop-up strobe flash unit that is activated to pop-up to a popped-up state from a stored position within the camera by pressing a top surface of the pop-up strobe flash unit;

biasing means that biases the pop-up strobe flash unit toward the popped-up state; and a latching means that functions to hold the pop-up strobe flash unit within the camera in the stored position when the top surface of the pop-up strobe flash unit is pressed to lower the pop-up strobe flash unit to its stored position within the camera and to release the pop-up strobe flash unit so that the biasing means causes the pop-up strobe flash unit to pop-up from the stored position to its popped-up state when the top surface of the pop-up strobe flash unit is pressed again.

6. A camera comprising:

camera body that includes a rotational cam section that is attached to the camera body via a first support pin so that the rotational cam section can both rotate about the first support pin as well as slide in an axial direction along the first support pin, said rotational cam section being biased in one direction of rotational movement about the first support pin and in another direction of sliding movement along the first support pin;

a strobe flash unit that is fixed to the camera body via a second support pin and is biased in one direction of rotational movement about the second support pin, the strobe flash unit being rotatable about the second support pin between a stored position within the camera body and an operative position wherein the strobe flash unit is popped-up from the camera body, said strobe flash unit including an electrical switch that automatically energizes main electrical power to the camera when the strobe flash unit is in the popped-up position and automatically shuts off main electrical power to the camera when the strobe flash unit is in the stored position;

said rotational cam section engaging a hook section of the flash unit when the flash unit is pressed so as to move the flash unit to the stored position against a bias force, and to retain the flash unit in the stored position upon release of pressing;

said rotational cam section including an axial direction cam that engages with the hook section when the strobe flash unit is pressed again to cause the rotational cam section to slide along the first support pin against a bias force to thereby release the hook section and allow the flash unit to pop up.

* * * * *

UNITED STATES PATENT AND TRADEMARK OFFICE
CERTIFICATE OF CORRECTION

PATENT NO. : 6,285,833 B1
DATED : September 4, 2001
INVENTOR(S) : Yamane

It is certified that error appears in the above-identified patent and that said Letters Patent is hereby corrected as shown below:

Column 5,
Line 15, delete "amotmt" and insert -- amount --;

Column 7,
Line 37, insert a period after "off"; and

Column 9, claim 6,
Line 2, change "camera body" to -- a camera body --.

Signed and Sealed this

Twenty-sixth Day of February, 2002

*Attest:*

JAMES E. ROGAN
*Attesting Officer*  *Director of the United States Patent and Trademark Office*